United States Patent
Huang et al.

(10) Patent No.: US 12,047,955 B2
(45) Date of Patent: Jul. 23, 2024

(54) SCHEDULING REQUEST (SR) OVERLAP WITH A PHYSICAL UPLINK SHARED CHANNEL (PUSCH) TRANSMISSION

(71) Applicant: QUALCOMM Incorporated, San Diego, CA (US)

(72) Inventors: Yi Huang, San Diego, CA (US); Pranay Sudeep Rungta, San Diego, CA (US); Amir Aminzadeh Gohari, Sunnyvale, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 16/780,440

(22) Filed: Feb. 3, 2020

(65) Prior Publication Data

US 2020/0267719 A1    Aug. 20, 2020

Related U.S. Application Data

(60) Provisional application No. 62/806,556, filed on Feb. 15, 2019.

(51) Int. Cl.
*H04W 72/21* (2023.01)
*H04L 1/1812* (2023.01)

(52) U.S. Cl.
CPC .......... *H04W 72/21* (2023.01); *H04L 1/1812* (2013.01)

(58) Field of Classification Search
CPC ......... H04W 72/1242; H04W 72/1268; H04W 72/0413
See application file for complete search history.

(56) References Cited

U.S. PATENT DOCUMENTS

| | | | | |
|---|---|---|---|---|
| 2019/0261391 A1* | 8/2019 | Kundu | ............... | H04W 72/0446 |
| 2019/0349061 A1* | 11/2019 | Cirik | ..................... | H04L 1/1858 |
| 2020/0008158 A1* | 1/2020 | Yamamoto | .......... | H04W 52/325 |
| 2020/0037314 A1* | 1/2020 | Xiong | .................. | H04L 5/0091 |
| 2020/0404651 A1* | 12/2020 | Takeda | ............... | H04W 72/0446 |
| 2021/0051509 A1* | 2/2021 | Wu | ....................... | H04L 1/1893 |
| 2021/0274488 A1* | 9/2021 | Yamamoto | ........ | H04W 72/1289 |

OTHER PUBLICATIONS

3GPP TSG RAN WG1 Meeting #93, "RAN1 Chairman's Notes," Busan, Korea, May 21-25, 2018, 3 pages.
R1-1810020, "CR to 38.213 capturing the RAN1#94 meeting agreements," Samsung, Sep. 4, 2018, 105 pages.
3GPP TS 38.213, "Physical layer procedures for control," V15.4.0, Dec. 2018, 104 pages.

(Continued)

*Primary Examiner* — Bo Hui A Zhu
(74) *Attorney, Agent, or Firm* — Guang Yu Zhang; Harrity & Harrity, LLP

(57) ABSTRACT

Various aspects of the present disclosure generally relate to wireless communication. In some aspects, a user equipment (UE) may determine whether a collision is to occur between a physical uplink control channel (PUCCH) transmission that includes a scheduling request (SR), and multiple physical uplink shared channel (PUSCH) transmissions in a slot. The UE may transmit, to a base station (BS), the PUCCH transmission or the multiple PUSCH transmissions based at least in part on determining whether the collision is to occur in the slot. Numerous other aspects are provided.

30 Claims, 14 Drawing Sheets

(56) References Cited

OTHER PUBLICATIONS

Huawei et al.,"Transmission of PUCCH and PUSCH with Partial Overlap", 3GPP Draft:R1-1802692, 3rd Generation Partnership Project (3GPP), Mobile Competence Centre ; 650, Route Des Lucioles ; F-06921 Sophia-Antipolis Cedex; France, vol. RAN WG1. No. Athens, Greece; Feb. 26, 2018-Mar. 2, 2018, Feb. 17, 2018 (Feb. 17, 2018), XP051398125, 3 Pages, Retrieved from the Internet: URL:http://www.3gpp.org/ftp/tsg%5Fran/WG1%5FRL1/TSGR1%5F92/Docs/ [retrieved on Feb. 17, 2018], Section 2, figure 1.
International Search Report and Written Opinion—PCT/US2020/016572—ISA/EPO—dated Apr. 30, 2020.
Spreadtrum Communications: "Remaining Issues of UCI Multiplexing", 3GPP Draft, R1-1806401, Remaining Issues of UCI Multiplexing V4, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051441606, 4 pages, Retrieved from the Internet: URL: http://www.3gpp.org/ftp/Meetings%6F3GPP%5FSYNC/RAN1/Docs/. [retrieved on May 20, 2018] section 2.1. section 2.3.
Xiaomi Communications: "On Remaining Issues of UC1 Multiplexing" 3GPP Draft, R1-1807168. 3rd Generation Partnership Project (3GPP), Mobile Competence Centre, 650, Route Des Lucioles, F-06921 Sophia-Antipolis Cedex, France, vol. RAN WG1, No. Busan. Korea, May 21, 2018-May 25, 2018, May 20, 2018 (May 20, 2018), XP051442366, 3 pages, Retrieved from the Internet: URL: http://www.3gpp.org/ftp/Meletings%5F3GPP%5FSYNC/RAN1/Docs/. [retrieved on May 20, 2018]section 2 .section 3 .section 4.2 .section 1.
Huawei et al., "Transmission of PUCCH and PUSCH with Partial Overlap", 3GPP Draft; R1-1802692, 3rd Generation Partnership Project (3GPP), Mobile Competence Centre ; 650, Route Des Luciole ; F-06921 Sophia-Antipolis Cedex; France, vol. RAN WG1. No. Athens, Greece; Feb. 26, 2018-Mar. 2, 2018, Feb. 17, 2018 (Feb. 17, 2018), XP051398125, 3 Pages, Retrieved from the Internet: URL:http://www.3gpp.org/ftp/tsg%5Fran/WG1%5FRL1/TSGR1%5F92/Docs/ [retrieved on Feb. 17, 2018], Section 2, figure 1.
International Search Report and Written Opinion—PCT/US2020/016572—ISA/EPO—Apr. 30, 2020.
Qualcomm Incorporated: "Summary of Remaining Issues for Overlapping UL Transmissions", 3GPP Draft; R1-1807820 Summary of Remaining Issues for Overlapping UL Transmissions Version 7, 3rd Generation Partnership (3GPP), Mobile Competence Centre, 650, Route Des Lucioles, F-06921 Sophia-Antipolis Cedex, Freance, vol. RAN WG1, No. 3rd Generation Partnership Project (3GPP), Mobile Competence Centre, 650, Route Des Lucioles, F-06921 Sophia-Antipolis Cedex, France, vol. RAN WG1, No. Busan, Korea; May 21, 2018-May 25, 2018 May 24, 2018, XP051463428, Retrieved from the Internet:URL:http://www.3gpp.org/ftp/tsg%5Fran/WG1%5FRL1/TSGR1%5F93/Docs [retrieved on May 24, 2018], 15 pages.
Spreadtrum Communications: "Remaining Issues of UCI Multiplexing", 3GPP Draft, R1-1806401, Remaining Issues of UCI Multiplexing V4, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051441606, 4 pages, Retrieved from the Internet: URL: http://www.3gpp.org/ftp/Meetings%5F3GPP%5FSYNC/RAN1/Docs./. [retrieved on May 20, 2018] section 2.1. section 2.3.
Xiaomi Communications: "On Remaining Issues of UCI Multiplexing" 3GPP Draft, R1-1807168. 3rd Generation Partnership Project (3GPP), Mobile Competence Centre, 650, Route Des Lucioles, F-06921 Sophia-Antipoilis Cedex, France vol. RAN WG1, No. Busan, Korea, May 21, 2018-May 25, 2018, May 20, 2018 (May 20, 2018), XP051442366, 3 pages, Retrieved from the Internet: URL: http://www.3gpp.org/ftp/Meletings%5F3GPP%5FSYNC/RAN1/Docs/. [retrieved n May 20, 2018]section 2 .section 3 .section 4.2 .section 1.

* cited by examiner

SCHEDULING REQUEST (SR) OVERLAP WITH A PHYSICAL UPLINK SHARED CHANNEL (PUSCH) TRANSMISSION

CROSS-REFERENCE TO RELATED APPLICATION

This Patent Application claims priority to U.S. Provisional Patent Application No. 62/806,556, filed on Feb. 15, 2019, entitled "SCHEDULING REQUEST (SR) OVERLAP WITH A PHYSICAL UPLINK SHARED CHANNEL (PUSCH) TRANSMISSION," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for scheduling request (SR) overlap with a physical uplink shared channel (PUSCH) transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

In NR, a physical uplink control channel (PUCCH) transmission that includes a scheduling request (SR) may collide (for example, overlap) with multiple physical uplink shared channel (PUSCH) transmissions in a slot. For example, the PUCCH transmission may collide with multiple PUSCH transmissions that include a PUSCH transmission with an uplink shared channel (UL-SCH) and a PUSCH transmission without an UL-SCH. Currently, a UE is configured to drop a PUSCH transmission if a SR overlaps with a PUSCH transmission without a UL-SCH, and is configured to drop a SR if the SR overlaps with a PUSCH transmission with a UL-SCH. These configurations do not account for the previously described scenario where a SR overlaps with multiple PUSCH transmissions that include both a PUSCH transmission with a UL-SCH and a PUSCH transmission without a UL-SCH. As such, communications of the UE may be negatively impacted via introduction of latency, via mis-dropping of transmissions, or the like in the previously described scenario. This consumes network resources between the UE and a base station (BS) as additional transmissions may be needed to correct a mis-dropped transmission. In addition, this consumes processing resources of the UE and the BS with respect to transmitting additional transmissions, receiving additional transmissions, or the like.

SUMMARY

In some aspects, a method of wireless communication, performed by a user equipment (UE), may include determining whether a collision is to occur between a physical uplink control channel (PUCCH) transmission that includes a scheduling request (SR), and multiple physical uplink shared channel (PUSCH) transmissions in a slot; and transmitting, to a base station (BS), the PUCCH transmission or the multiple PUSCH transmissions based at least in part on determining whether the collision is to occur in the slot.

In some aspects, a UE for wireless communication may include memory and one or more processors operatively coupled to the memory. The memory and the one or more processors may be configured to determine whether a collision is to occur between a PUCCH transmission that includes a SR, and multiple PUSCH transmissions in a slot; and transmit, to a BS, the PUCCH transmission or the multiple PUSCH transmissions based at least in part on determining whether the collision is to occur in the slot.

In some aspects, a non-transitory computer-readable medium may store one or more instructions for wireless communication. The one or more instructions, when executed by one or more processors of a UE, may cause the one or more processors to: determine whether a collision is to occur between a PUCCH transmission that includes a SR, and multiple PUSCH transmissions in a slot; and transmit, to a BS, the PUCCH transmission or the multiple PUSCH transmissions based at least in part on determining whether the collision is to occur in the slot.

In some aspects, a first apparatus for wireless communication may include means for determining whether a collision is to occur between a PUCCH transmission that includes a SR, and multiple PUSCH transmissions in a slot; and means for transmitting, to a second apparatus, the PUCCH transmission or the multiple PUSCH transmissions based at least in part on determining whether the collision is to occur in the slot.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
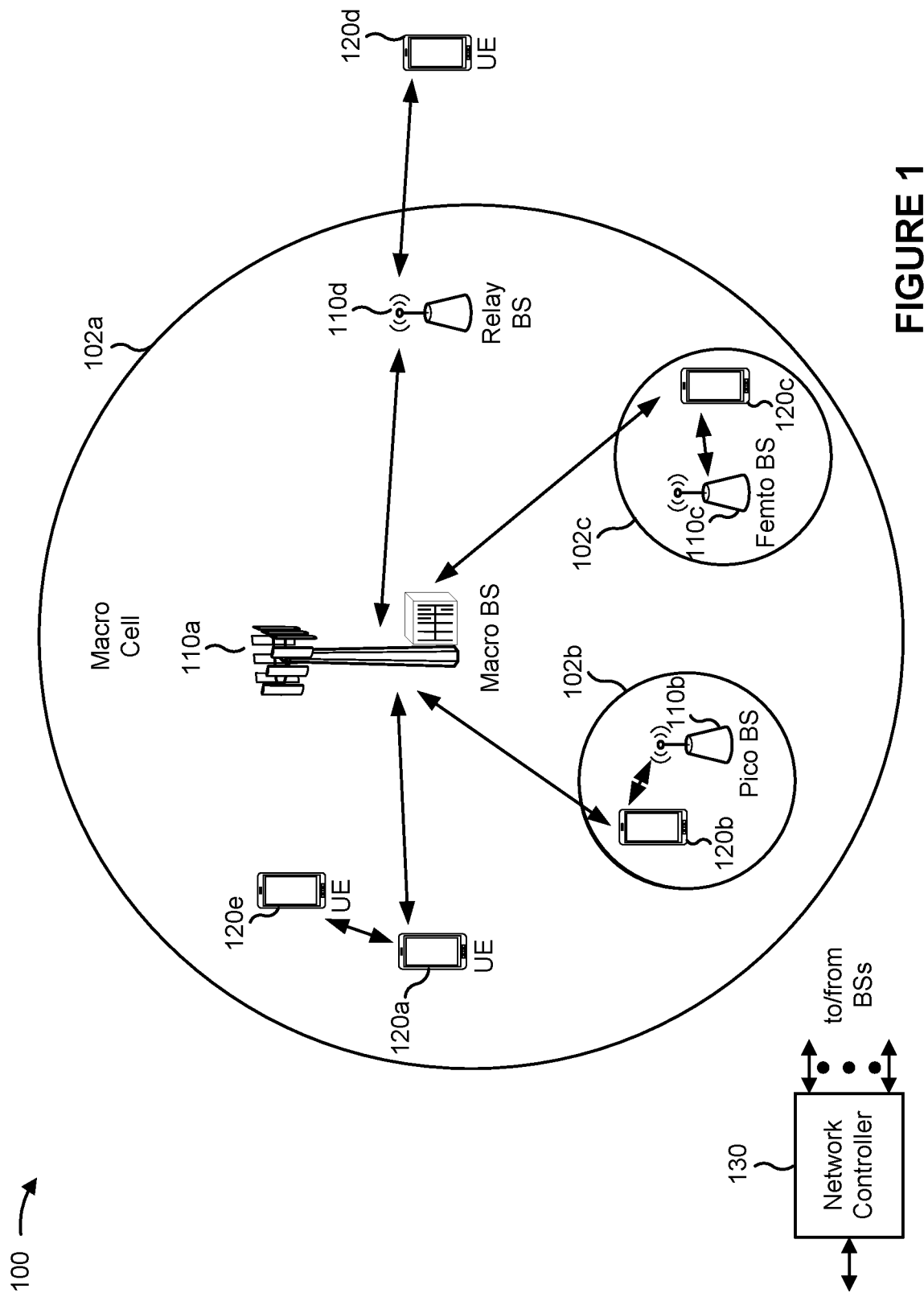
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G or 4G wireless technologies, aspects of the present disclosure can be applied in other generation-based communication systems, such as 5G and later, including NR technologies.

In NR, a physical uplink shared channel (PUSCH) is an uplink physical channel and an uplink shared channel (UL-SCH) is an uplink transport channel, which is a medium access control (MAC) layer channel. A PUSCH transmission may include a UL-SCH transmission, L1 control information, or L2 control information. A UL-SCH transmission may include uplink data over a transport channel. A physical uplink control channel (PUCCH) transmission that includes a scheduling request (SR) may collide (for example, overlap) with multiple PUSCH transmissions in a slot. For example, the PUCCH transmission may collide with multiple PUSCH transmissions that include a PUSCH transmission with a UL-SCH and a PUSCH transmission without an UL-SCH. Currently, a UE is configured to drop a PUSCH transmission if a SR overlaps with a PUSCH transmission without a UL-SCH, and is configured to drop a SR if the SR overlaps with a PUSCH transmission with a UL-SCH. These configurations do not account for the previously described scenario where a SR overlaps with multiple PUSCH transmissions that include both a PUSCH transmission with a UL-SCH and a PUSCH transmission without a UL-SCH. As such, communications of the UE may be negatively impacted via introduction of latency, via mis-dropping of transmissions, or the like in the previously described scenario. This consumes network resources between the UE and a base station (BS) as additional transmissions may be needed to correct a mis-dropped transmission. In addition, this consumes processing resources of the UE and the BS with respect to transmitting additional transmissions, receiving additional transmissions, or the like.

Some techniques and apparatuses described herein provide for priority dropping of one or more transmissions when a PUCCH transmission with a SR is to collide with multiple PUSCH transmissions in a slot. For example, depending on whether one or more of the multiple PUSCH transmissions include a UL-SCH transmission, a UE may drop the PUCCH transmission or the multiple PUSCH transmissions. This reduces or eliminates negative impacts to communications that would otherwise have occurred when the multiple PUSCH transmissions include at least one PUSCH transmission with a UL-SCH transmission. For example, the priority dropping described herein reduces or eliminates latency in transmissions from the UE that would otherwise have occurred in the previously described scenario. In addition, this conserves processing resources of the UE or a BS that would otherwise be consumed as a result of a mis-dropped transmission. Further, priority dropping in the previously described scenario facilitates improved coordination between a UE and a BS, thereby reducing or eliminating mis-matches in operation between the UE and the BS (for example, where the UE drops a transmission that the BS is expecting to receive), reduces or eliminates a need for signaling between the UE and the BS that would otherwise be used to coordinate operation between the UE and the BS, or the like.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not necessarily be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, or the like, or combinations thereof using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a, 120b, 120c) may be dispersed throughout wireless network 100, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V21) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
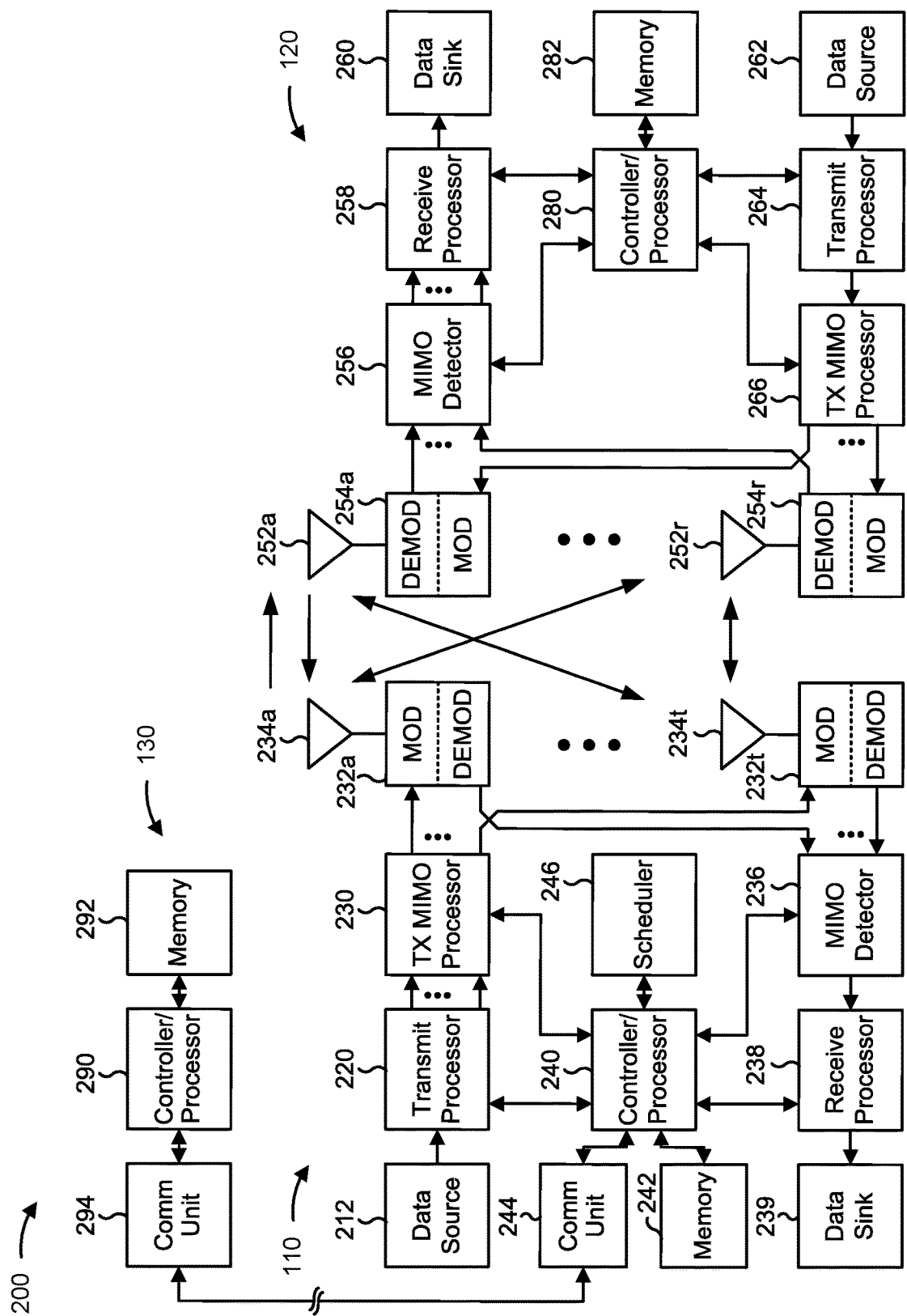
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with priority dropping for SR overlap with a PUSCH transmission, as described in more detail elsewhere herein. For example, controller/processor 240 of base station 110, controller/processor 280 of UE 120, or any other component(s) of FIG. 2 may perform or direct operations of, for example, process 1100 of FIG. 11, or other processes as described herein. Memories 242 and 282 may store data and program codes for base station 110 and UE 120, respectively. A scheduler 246 may schedule UEs for data transmission on the downlink or uplink.

In some aspects, UE 120 may include means for determining whether a collision is to occur between a PUCCH transmission that includes a SR, and multiple PUSCH transmissions in a slot, means for transmitting, to a BS 110, the PUCCH transmission or the multiple PUSCH transmissions based at least in part on determining whether the collision is to occur in the slot, or the like, or combinations thereof. In some aspects, such means may include one or more components of UE 120 described in connection with FIG. 2.

Figure 3A:
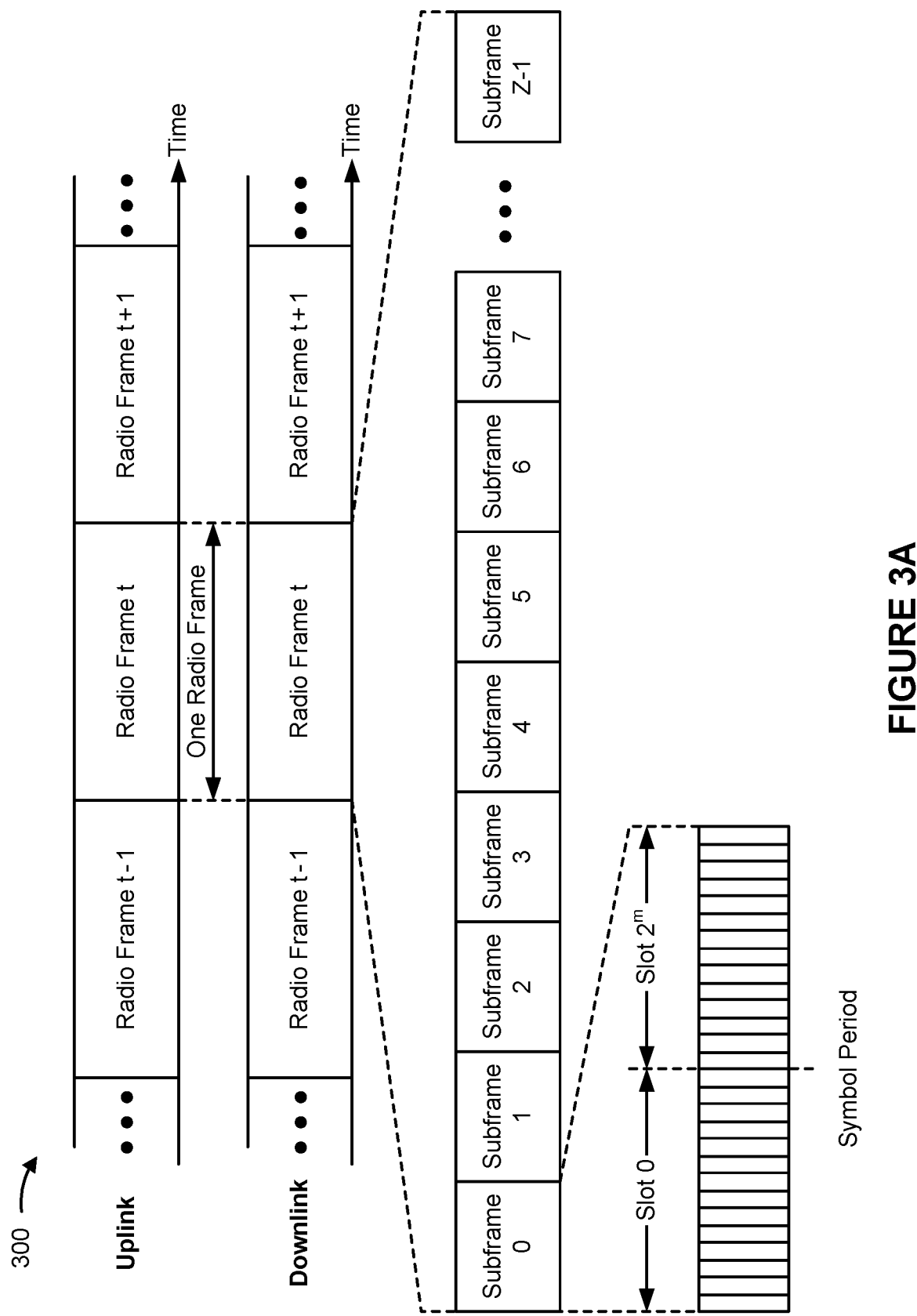
FIG. 3A is a block diagram illustrating an example frame structure for use in a wireless network in accordance with various aspects of the present disclosure.

FIG. 3A is a block diagram illustrating an example frame structure 300 for use in a wireless network in accordance with various aspects of the present disclosure. For example, frame structure 300 may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3A, where m is numerology used for a transmission, such as 0, 1, 2, 3, 4, or the like, or combinations thereof). Each slot may include a set of L symbol periods. For example, each slot may include fourteen symbol periods (for example, as shown in FIG. 3A), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, or the like, or combinations thereof.

While some techniques are described herein in connection with frames, subframes, slots, or the like, or combinations thereof, these techniques may equally apply to other types of wireless communication structures, which may be referred to using terms other than "frame," "subframe," "slot," or the like, or combinations thereof in 5G NR. In some aspects, a wireless communication structure may refer to a periodic time-bounded communication unit defined by a wireless communication standard or protocol. Additionally or alternatively, different configurations of wireless communication structures than those shown in FIG. 3A may be used.

In some telecommunications (for example, NR), a base station may transmit synchronization signals. For example, a base station may transmit a primary synchronization signal (PSS), a secondary synchronization signal (SSS), or the like, or combinations thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, or the PBCH in accordance with a synchronization communication hierarchy (for example, a synchronization signal (SS) hierarchy) including multiple synchronization communications (for example, SS blocks), as described below in connection with FIG. 3B.

Figure 3B:
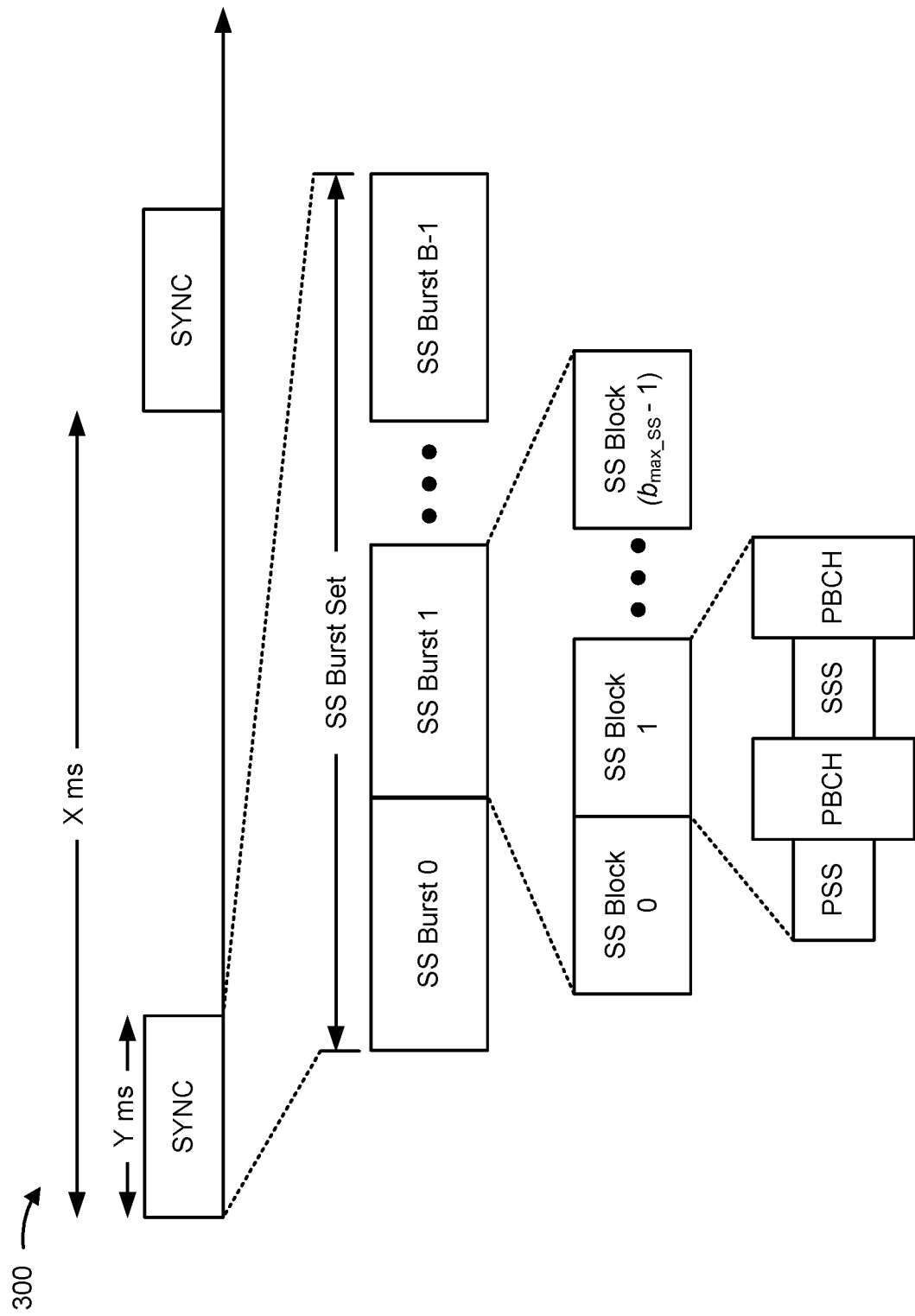
FIG. 3B is a block diagram illustrating an example synchronization communication hierarchy for use in a wireless communication network in accordance with various aspects of the present disclosure.

FIG. 3B is a block diagram illustrating an example synchronization communication hierarchy for use in a wireless communication network in accordance with various aspects of the present disclosure. The SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum quantity of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum quantity of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, or other synchronization signals (for example, a tertiary synchronization signal (TSS)) or synchronization channels. In some aspects, multiple SS blocks are included in an SS burst, and the PSS, the SSS, or the PBCH may be the same across each SS block of the SS burst. In some aspects, a single SS block may be included in an SS burst. In some aspects, the SS block may be at least four symbol periods in length, where each symbol carries one or more of the PSS (for example, occupying one symbol), the SSS (for example, occupying one symbol), or the PBCH (for example, occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (for example, consecutive symbol periods) during one or more slots. Additionally or alternatively, one or more SS blocks of the SS burst may be transmitted in non-consecutive radio resources.

In some aspects, the SS bursts may have a burst period during which the SS blocks of the SS burst are transmitted by the base station in accordance with the burst period. In other words, the SS blocks may be repeated during each SS burst. In some aspects, the SS burst set may have a burst set periodicity, and the SS bursts of the SS burst set are transmitted by the base station in accordance with the fixed burst set periodicity. In other words, the SS bursts may be repeated during each SS burst set.

The base station may transmit system information, such as system information blocks (SIBS) on a physical downlink shared channel (PDSCH) in some slots. The base station may transmit control information/data on a physical downlink control channel (PDCCH) in C symbol periods of a slot, where C may be configurable for each slot. The base station may transmit traffic data or other data on the PDSCH in the remaining symbol periods of each slot.

Figure 4:
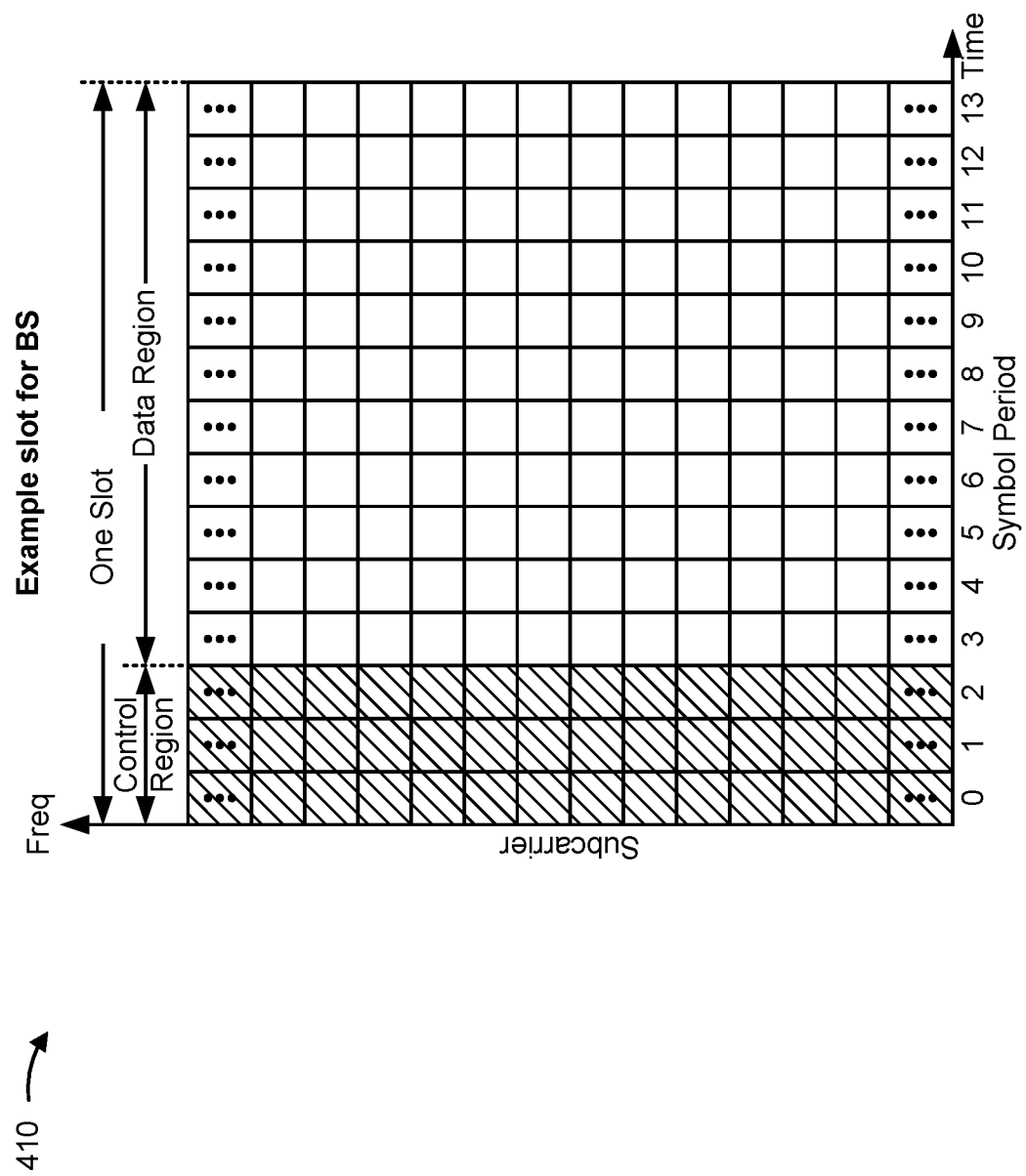
FIG. 4 is a block diagram illustrating an example slot format in accordance with various aspects of the present disclosure.

FIG. 4 is a block diagram 400 conceptually illustrating an example slot format 410 in accordance with various aspects of the present disclosure. The available time frequency resources may be partitioned into resource blocks. Each resource block may cover a set of subcarriers (for example, 12 subcarriers) in one slot and may include a quantity of resource elements. Each resource element may cover one subcarrier in one symbol period (for example, in time) and may be used to send one modulation symbol, which may be a real or complex value.

An interlace structure may be used for each of the downlink and uplink for FDD in some telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, ..., Q−1}.

A UE may be located within the coverage of multiple BSs. One of these BSs may be selected to serve the UE. The serving BS may be selected based at least in part on various criteria such as received signal strength, received signal quality, path loss, or the like, or combinations thereof. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate in accordance with a new air interface (for example, other than Orthogonal Frequency Divisional Multiple Access (OFDMA)-based air interfaces) or fixed transport layer (for example, other than Internet Protocol (IP)). In aspects, NR may utilize OFDM with a cyclic prefix (CP) (herein referred to as cyclic prefix OFDM or CP-OFDM) or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) or DFT-s-OFDM on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some aspects, a single component carrier (CC) bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, NR may support a different air interface, other than an OFDM-based interface. NR networks may include entities such central units or distributed units.

Figure 5:
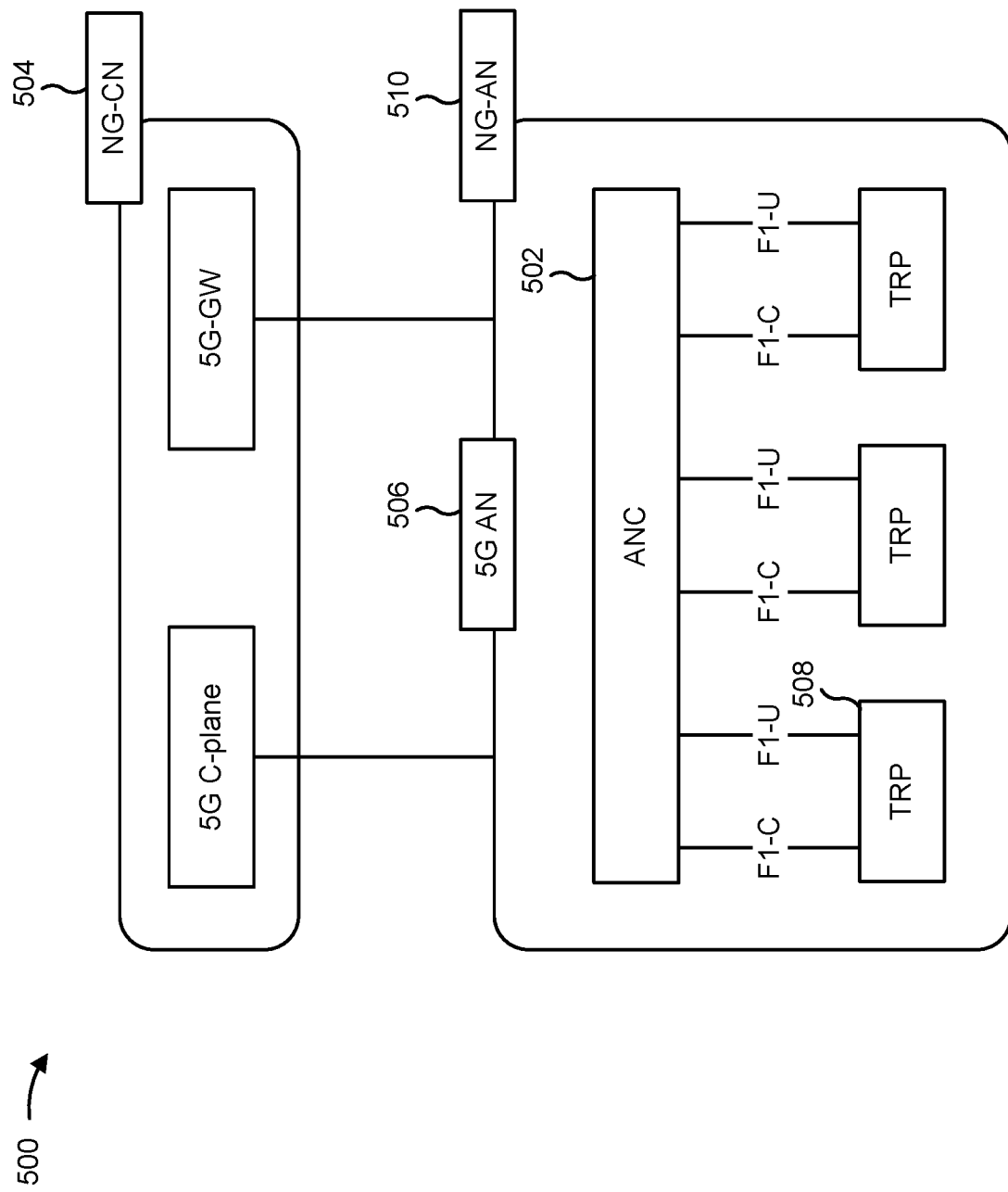
FIG. 5 illustrates an example logical architecture of a distributed radio access network (RAN) in accordance with various aspects of the present disclosure.

FIG. 5 illustrates an example logical architecture of a distributed radio access network (RAN) 500 in accordance with various aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) 510 may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (for example, dynamic selection) or jointly (for example, joint transmission) serve traffic to a UE.

The local architecture of RAN 500 may be used to support fronthaul definition. The architecture may be defined to support fronthauling solutions across different deployment types. For example, the architecture may be based at least in part on transmit network capabilities (for example, bandwidth, latency, or jitter).

The architecture may share features or components with LTE. In some aspects, NG-AN 510 may support dual connectivity with NR. NG-AN 510 may share a common fronthaul for LTE and NR.

The architecture may enable cooperation between and among TRPs 508. For example, cooperation may be preset within a TRP or across TRPs via the ANC 502. In some aspects, no inter-TRP interface may be needed/present.

In some aspects, a dynamic configuration of split logical functions may be present within the architecture of RAN 500. The packet data convergence protocol (PDCP), radio link control (RLC), and MAC protocol layers may be adaptably placed at the ANC or TRP.

Figure 6:
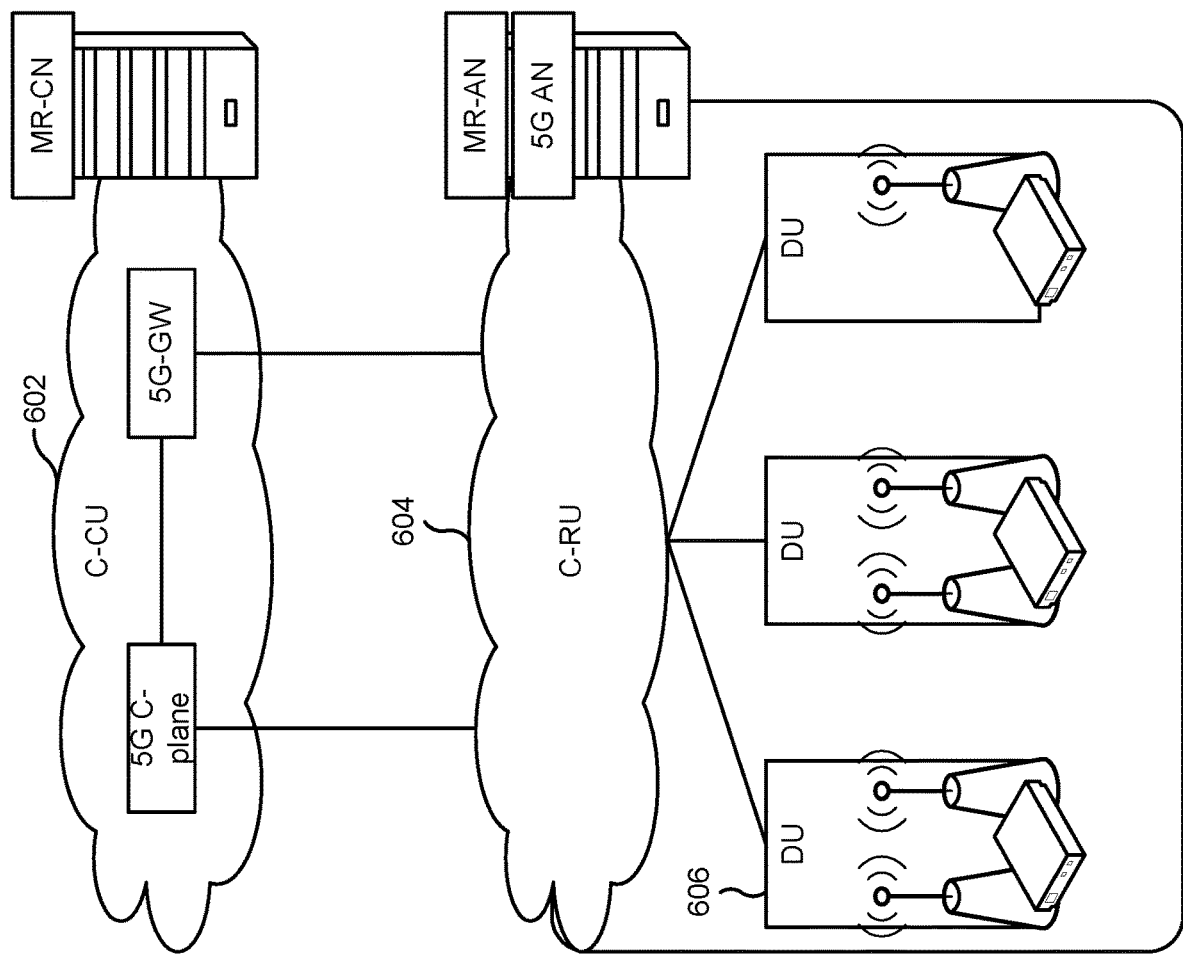
FIG. 6 illustrates an example physical architecture of a distributed RAN in accordance with various aspects of the present disclosure.

FIG. 6 illustrates an example physical architecture of a distributed RAN 600 in accordance with various aspects of the present disclosure. A centralized core network unit (C-CU) 602 may host core network functions. The C-CU may be centrally deployed. C-CU functionality may be offloaded (for example, to advanced wireless services (AWS)), in an effort to handle peak capacity. A centralized RAN unit (C-RU) 604 may host one or more ANC functions. Optionally, the C-RU may host core network functions locally. The C-RU may have distributed deployment. The C-RU may be closer to the network edge. A distributed unit (DU) 606 may host one or more TRPs. The DU may be located at edges of the network with radio frequency (RF) functionality.

Figure 7:
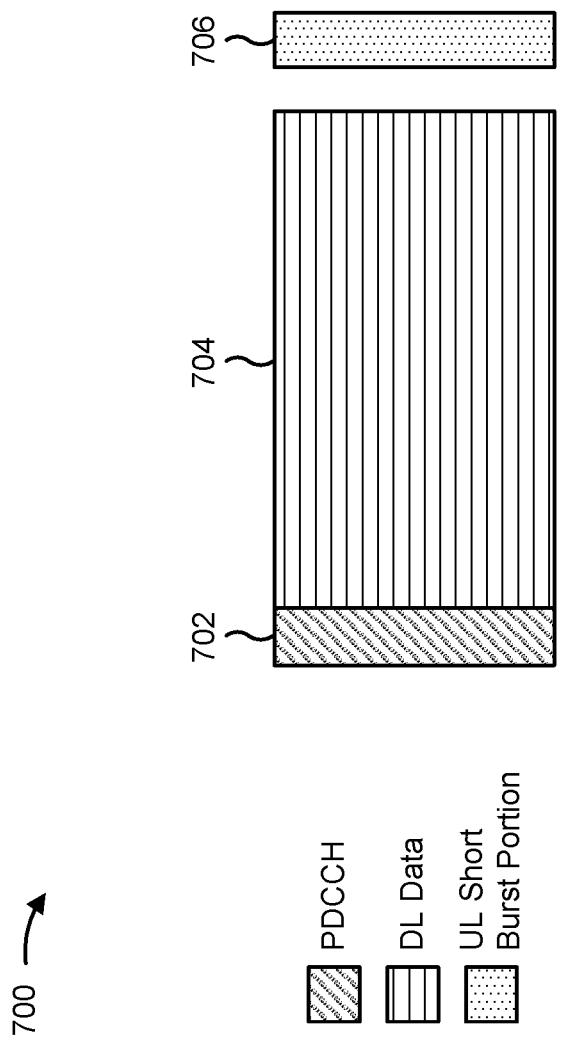
FIG. 7 is a diagram showing an example downlink (DL)-centric slot or communication structure in accordance with various aspects of the present disclosure.

FIG. 7 is a diagram showing an example downlink (DL)-centric slot 700 or communication structure in accordance with various aspects of the present disclosure. The DL-centric slot (or wireless communication structure) may include a control portion 702 during which the scheduling entity (for example, UE or BS) transmits various scheduling information or control information corresponding to various portions of the DL-centric slot to the subordinate entity (for example, UE). The control portion 702 may exist in the initial or beginning portion of the DL-centric slot. In some configurations, the control portion 702 may be a physical DL control channel PDCCH, as indicated in FIG. 7. In some aspects, the control portion 702 may include legacy PDCCH information, shortened PDCCH (sPDCCH) information), a control format indicator (CFI) value (for example, carried on a physical control format indicator channel (PCFICH)), one or more grants (for example, downlink grants, uplink grants, or the like, or combinations thereof), or the like, or combinations thereof.

The DL-centric slot may also include a DL data portion 704 during which the scheduling entity (for example, UE or BS) transmits DL data to the subordinate entity (for example, UE) using communication resources utilized to communicate DL data. The DL data portion 704 may sometimes be referred to as the payload of the DL-centric slot. In some configurations, the DL data portion 704 may be a PDSCH.

The DL-centric slot may also include an UL short burst portion 706 during which the subordinate entity (for example, UE) transmits reference signals or feedback to the scheduling entity (for example, UE or BS) using communication resources utilized to communicate UL data. The UL short burst portion 706 may sometimes be referred to as an UL burst, an UL burst portion, a common UL burst, a short burst, an UL short burst, a common UL short burst, a common UL short burst portion, or various other suitable terms. In some aspects, the UL short burst portion 706 may include one or more reference signals. Additionally or alternatively, the UL short burst portion 706 may include feedback information corresponding to various other portions of the DL-centric slot. For example, the UL short burst portion 706 may include feedback information corresponding to the control portion 702 or the data portion 704. Non-limiting examples of information that may be included in the UL short burst portion 706 include an acknowledgement (ACK) signal (for example, a PUCCH ACK, a PUSCH ACK, or an immediate ACK), a negative acknowledgement (NACK) signal (for example, a PUCCH NACK, a PUSCH NACK, or an immediate NACK), a SR, a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, or various other suitable types of information. The UL short burst portion 706 may include additional or alternative information, such as information pertaining to RACH procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, or various other suitable terms. This separation provides time for the switch-over from DL communication (for example, reception operation by the subordinate entity (for example, BS or UE)) to UL communication (for example, transmission by the subordinate entity (for example, UE)). The foregoing provides some examples of a DL-centric wireless communication structure, but alternative structures having similar features may exist without necessarily deviating from the aspects described herein.

Figure 8:
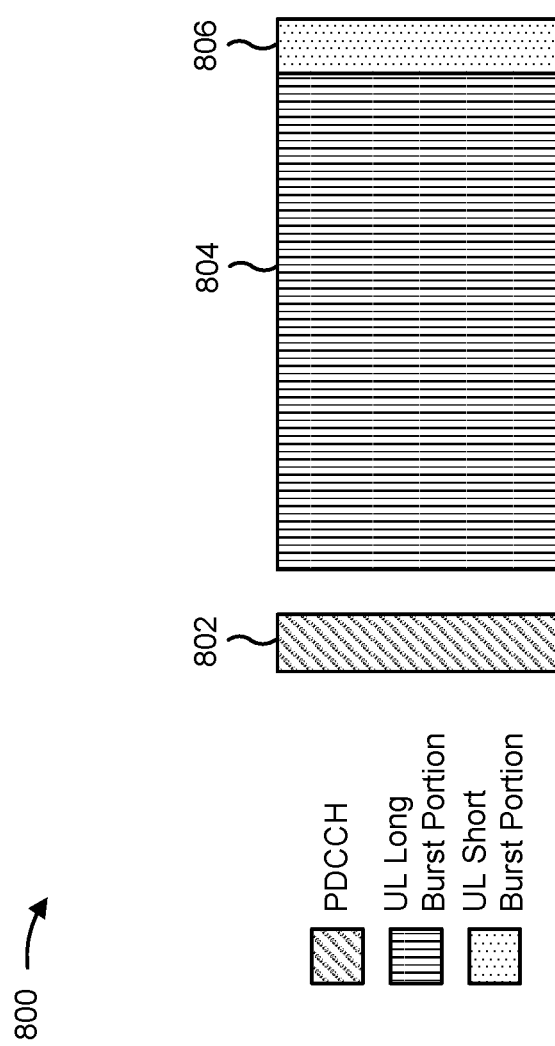
FIG. 8 is a diagram showing an example uplink (UL)-centric slot or communication structure in accordance with various aspects of the present disclosure.

FIG. 8 is a diagram showing an example uplink (UL)-centric slot 800 or communication structure in accordance with various aspects of the present disclosure. The UL-centric slot (or wireless communication structure) may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (for example, UE) to the scheduling entity (for example, UE or BS). In some configurations, the control portion 802 may be a physical DL control channel PDCCH.

As illustrated in FIG. 8, the end of the control portion 802 may be separated in time from the beginning of the UL long burst portion 804. This time separation may sometimes be referred to as a gap, guard period, guard interval, or various other suitable terms. This separation provides time for the switch-over from DL communication (for example, reception operation by the scheduling entity) to UL communication (for example, transmission operation by the scheduling entity).

The UL-centric slot may also include an DL short burst portion 806. The DL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (for example, UEs) may communicate with each other using sidelink signals. Real-world applications of such sidelink communications may include public safety, proximity services, UE-to-network relaying, V2V communications, Internet of Everything (IoE) communications, IoT communications, mission-critical mesh, or various other suitable applications. Generally, a sidelink signal may refer to a signal communicated from one subordinate entity (for example, UE1) to another subordinate entity (for example, UE2) without relaying that communication through the scheduling entity (for example, UE or BS), even though the scheduling entity may be utilized for scheduling or control purposes. In some aspects, the sidelink signals may be communicated using a licensed spectrum band; in other aspects, the sidelink signals may be communicated using an unlicensed spectrum band.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

In NR, a PUCCH transmission that includes a SR may collide (for example, overlap) with multiple PUSCH transmissions in a slot. For example, the PUCCH transmission may collide with multiple PUSCH transmissions that include a PUSCH transmission with a UL-SCH and a PUSCH transmission without an UL-SCH. Currently, a UE is configured to drop a PUSCH transmission if a SR overlaps with a PUSCH transmission without a UL-SCH, and is configured to drop a SR if the SR overlaps with a PUSCH transmission with a UL-SCH. These configurations do not account for the previously described scenario where a SR overlaps with multiple PUSCH transmissions that include both a PUSCH transmission with a UL-SCH and a PUSCH transmission without a UL-SCH. As such, communications of the UE may be negatively impacted via introduction of latency, via mis-dropping of transmissions, or the like in the previously described scenario. This consumes network resources between the UE and a BS as additional transmissions may be needed to correct a mis-dropped transmission. In addition, this consumes processing resources of the UE and the BS with respect to transmitting additional transmissions, receiving additional transmissions, or the like.

Some techniques and apparatuses described herein provide for priority dropping of one or more transmissions when a PUCCH transmission with a SR is to collide with multiple PUSCH transmissions in a slot. For example, depending on whether one or more of the multiple PUSCH transmissions include a UL-SCH transmission, a UE may drop the PUCCH transmission or the multiple PUSCH transmissions. This reduces or eliminates negative impacts to communications that would otherwise have occurred when the multiple PUSCH transmissions include at least one PUSCH transmission with a UL-SCH transmission. For example, the priority dropping described herein reduces or eliminates latency in transmissions from the UE that would otherwise have occurred in the previously described scenario. In addition, this conserves processing resources of the UE or a BS that would otherwise be consumed as a result of a mis-dropped transmission. Further, priority dropping in the previously described scenario facilitates improved coordination between a UE and a BS, thereby reducing or eliminating mis-matches in operation between the UE and the BS (for example, where the UE drops a transmission that the BS is expecting to receive), reduces or eliminates a need for signaling between the UE and the BS that would otherwise be used to coordinate operation between the UE and the BS, or the like.

Figure 9:
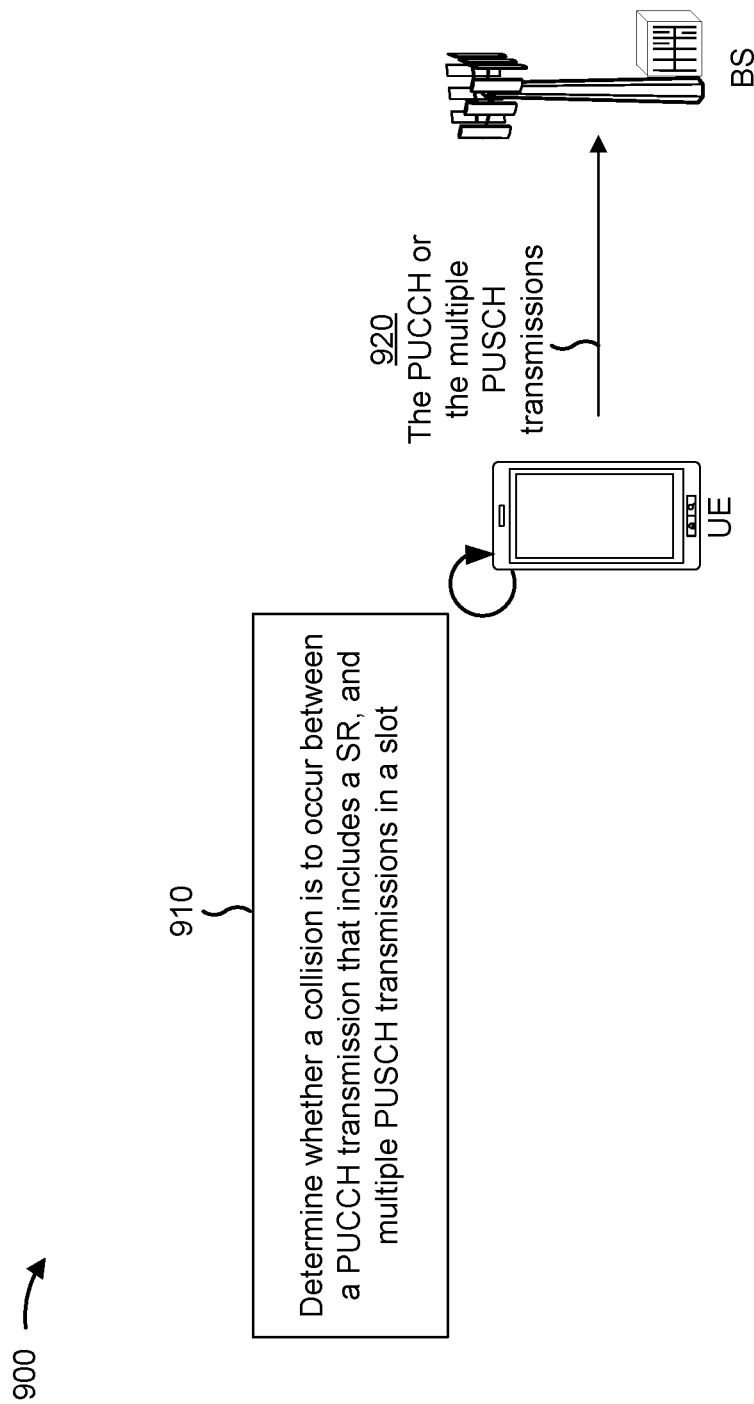
FIGS. 9 and 10 are diagrams illustrating one or more example operations related to a scheduling request (SR) overlap with a physical uplink shared channel (PUSCH) in accordance with various aspects of the present disclosure.

FIG. 9 is a diagram 900 illustrating one or more example operations related to a SR overlap with a PUSCH transmission in accordance with various aspects of the present disclosure. As shown, FIG. 9 includes a UE (for example, UE 120) and a BS (for example, BS 110).

In a first operation 910, the UE may determine whether a collision is to occur between a PUCCH transmission that includes a SR, and multiple PUSCH transmissions in a slot. For example, the UE may determine that the PUCCH transmission and the multiple PUSCH transmissions are to collide based on the PUCCH transmission and the multiple PUSCH transmissions overlapping in at least one slot. The PUCCH transmission may include the SR and a HARQ ACK; the SR and CSI; the SR, the HARQ ACK, and the CSI; or the SR alone without the HARQ ACK or the CSI. The multiple PUSCH transmissions may include at least one PUSCH transmission with a UL-SCH or at least one PUSCH transmission without a UL-SCH. The PUCCH transmission and the multiple PUSCH transmissions may be associated with a same CC or with different CCs.

The UE may determine whether the collision is to occur based at least in part on performing multiplexing of uplink control information (UCI). For example, prior to determining whether the PUCCH transmission and the multiple PUSCH transmissions are to collide, the UE may perform multiplexing of UCI associated with the SR with the HARQ ACK or the CSI, depending on whether the HARQ ACK or the CSI are included in the PUCCH transmission. The UE may determine a resource (for example, a time resource, a frequency resource, or a time-frequency resource) to be used for the PUCCH transmission. For example, the UE may determine the resource based at least in part on performing the multiplexing and prior to determining whether the PUCCH transmission and the multiple PUSCH transmissions are to collide.

If the UE determines that the PUCCH transmission and the multiple PUSCH transmissions are not to collide, the UE may transmit, and the BS may receive, the PUCCH transmission and the multiple PUSCH transmissions as scheduled. Conversely, if the UE determines that the PUCCH transmission and the multiple PUSCH transmissions are to collide in a slot, the UE may determine whether the multiple PUSCH transmissions include a PUSCH transmission with a UL-SCH transmission in the slot. For example, the UE may determine whether the PUCCH transmission is to collide with at least one PUSCH transmission with a UL-SCH transmission in the slot if the UE determines that the PUCCH transmission and the multiple PUSCH transmissions are to collide in the slot.

If the UE determines that the multiple PUSCH transmissions do not include a PUSCH transmission with a UL-SCH transmission, the UE may drop the multiple PUSCH transmissions. In this case, the UE may transmit, and the BS may receive, the PUCCH transmission. For example, the UE may transmit the SR with the HARQ ACK, with the CSI, with the UCI, or the like depending on a presence of the HARQ ACK, the CSI, the UCI, or the like in the PUCCH transmission based at least in part on determining that the multiple PUSCH transmissions include a PUSCH transmission with a UL-SCH transmission. Conversely, if the UE determines that the multiple PUSCH transmissions include a PUSCH transmission with a UL-SCH transmission, the UE may drop the SR from the PUCCH transmission. In addition, the UE may determine to not re-determine a resource for the PUCCH transmission based at least in part on dropping the SR. For example, the UE may perform other operations, described below, to combine remaining information associated with the PUCCH transmission with one of the PUSCH transmissions.

In some aspects, and based at least in part on dropping the SR, the UE may drop the PUCCH transmission or may perform multiplexing of remaining UCI. For example, if there is no remaining UCI associated with the PUCCH transmission after dropping the SR, the UE may drop the PUCCH transmission. Conversely, and as another example, if there is remaining UCI associated with the PUCCH transmission, the UE may perform multiplexing of the UCI with one of the multiple PUSCH transmissions based at least in part on dropping the SR. Continuing with the previous example, the UE may perform multiplexing of the remaining UCI with a PUSCH transmission with a UL-SCH transmission or with a PUSCH transmission without a UL-SCH transmission. In this case, the UE may drop the PUCCH transmission based at least in part on performing the multiplexing of the remaining UCI with one of the PUSCH transmissions.

In a second operation 920, the UE may transmit, and the BS may receive, the PUCCH transmission or the multiple PUSCH transmissions. For example, the UE may transmit the PUCCH transmission based at least in part on dropping the multiple PUSCH transmissions. Conversely, and as another example, the UE may transmit the multiple PUSCH transmissions based at least in part on dropping the PUCCH transmission. The BS may receive the PUCCH transmission or the multiple PUSCH transmissions, depending on which are transmitted, and may perform operations related to the PUCCH transmission or the multiple PUSCH transmissions. For example, the BS may schedule a transmission from the UE, may process user data in a UL-SCH transmission, or the like.

Figure 10:
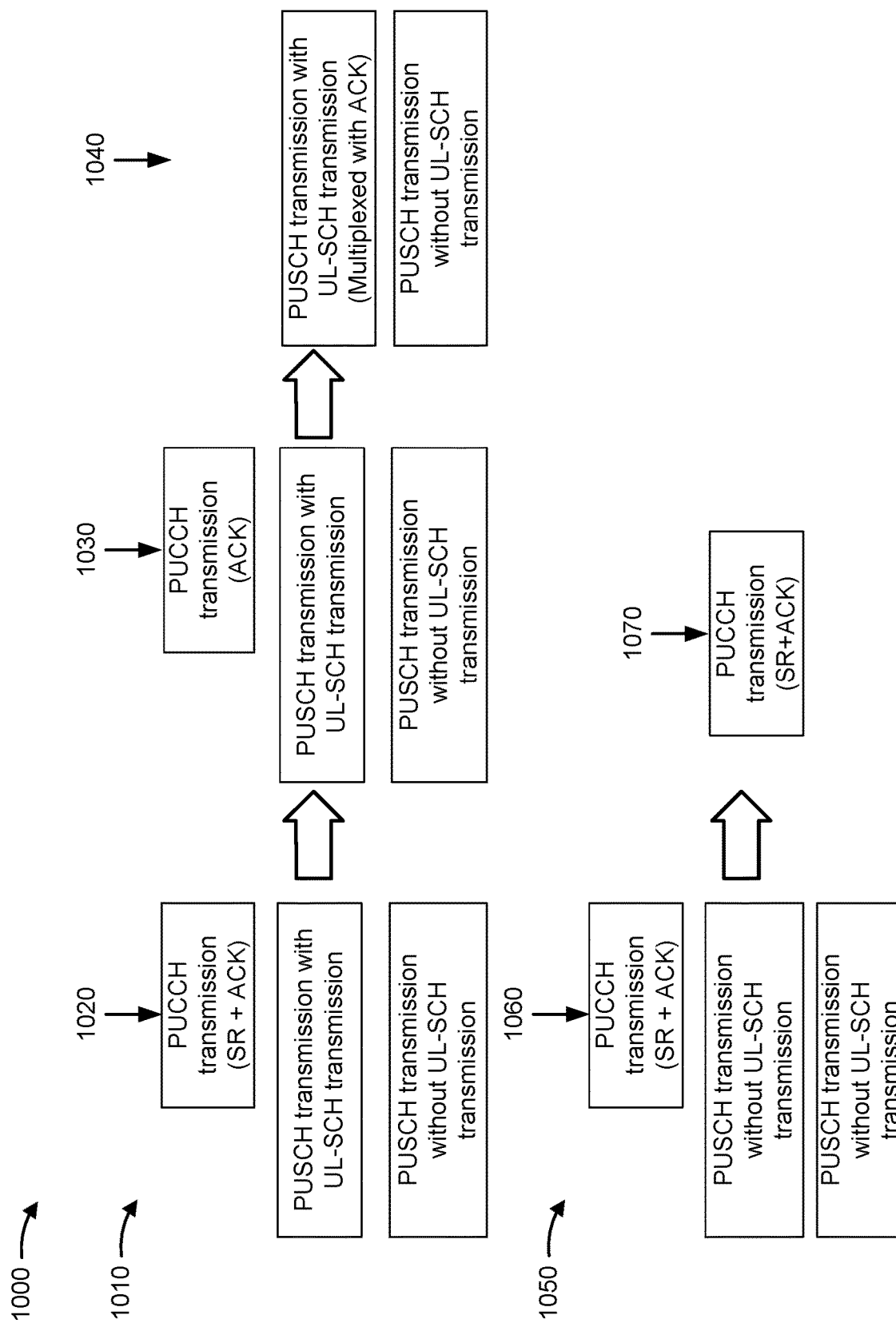

FIG. 10 is a diagram 1000 illustrating one or more example operations related to a SR overlap with a PUSCH transmission in accordance with various aspects of the present disclosure. For example, FIG. 10 shows example operations of a UE (for example, UE 120) related to SR overlap with a PUSCH transmission.

In a first set of operations 1010, the UE may perform operations related to a SR overlap with a PUSCH transmission. For example, and as shown in FIG. 10, a PUCCH transmission may include a SR and an ACK (for example, a HARQ ACK). In a first operation 1020, of the first set of operations 1010, the UE may determine that a PUCCH transmission is to collide with multiple PUSCH transmissions in a slot and that the multiple PUSCH transmissions include a PUSCH transmission with a UL-SCH transmission, as described elsewhere herein. For example, the UE may perform these operations based at least in part on determining a resource for the PUCCH transmission.

In a second operation 1030, of the first set of operations 1010, the UE may drop the SR from the PUCCH transmission, as described elsewhere herein. For example, after dropping the SR, the PUCCH transmission may only include the ACK. In a third operation 1040, of the first set of operations 1010, the UE may perform multiplexing of the ACK with one of the PUSCH transmissions, as described elsewhere herein. For example, the UE may perform multiplexing of the ACK with the PUSCH transmission with the UL-SCH transmission and may drop the PUCCH transmission based at least in part on performing the multiplexing. In some aspects, the UE may transmit, and a BS (for example, BS 110) may receive, the multiple PUSCH transmissions.

In a second set of operations 1050, the UE may perform operations related to a SR overlap with a PUSCH transmission. For example, and as shown in FIG. 10, a PUCCH transmission may include a SR and an ACK (for example, a HARQ ACK). In a first operation 1060, of the second set of operations 1050, the UE may determine that the PUCCH transmission is to collide with multiple PUSCH transmissions in a slot, as described elsewhere herein. Additionally or alternatively, the UE may determine that the multiple PUSCH transmissions do not include a PUSCH transmission with a UL-SCH transmission based at least in part on determining that the PUCCH transmission is to collide with the multiple PUSCH transmissions in the slot. In a second operation 1070, of the second set of operations 1050, the UE may drop the multiple PUSCH transmissions based at least in part on determining that the multiple PUSCH transmissions do not include a PUSCH transmission with a UL-SCH transmission. In some aspects, the UE may transmit, and a BS (for example, BS 110) may receive, the PUCCH transmission based at least in part on dropping the multiple PUSCH transmissions.

Figure 11:
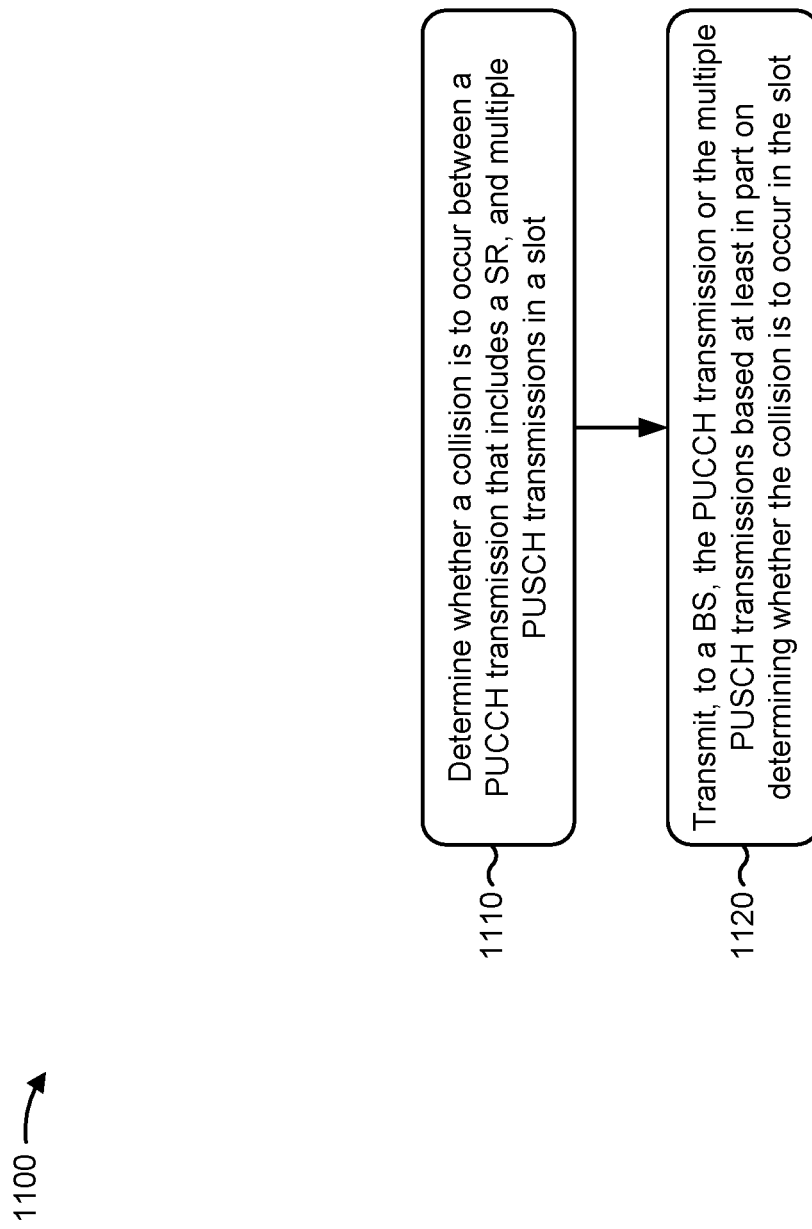
FIG. 11 is a diagram illustrating an example process performed by a UE in accordance with various aspects of the present disclosure.

FIG. 11 is a diagram illustrating an example process 1100 performed, for example, by a UE, in accordance with various aspects of the present disclosure. Example process 1100 is an example where a UE (for example, UE 120) performs operations relating to a SR overlap with a PUSCH transmission.

As shown in FIG. 11, in some aspects, process 1100 may include determining whether a collision is to occur between a PUCCH transmission that includes a SR, and multiple PUSCH transmissions in a slot (block 1110). For example, the UE (for example, using controller/processor 280 or the like) may determine whether a collision is to occur between a PUCCH transmission that includes a SR, and multiple PUSCH transmissions in a slot, as described above.

As shown in FIG. 11, in some aspects, process 1100 may include transmitting, to a BS, the PUCCH transmission or the multiple PUSCH transmissions based at least in part on determining whether the collision is to occur in the slot (block 1120). For example, the UE (for example, using controller/processor 280, transmit processor 264, TX MIMO processor 266, MOD 254, antenna 252, or the like) may transmit, to a BS, the PUCCH transmission or the multiple PUSCH transmissions based at least in part on determining whether the collision is to occur in the slot, as described above.

Process 1100 may include additional aspects, such as any single aspect or any combination of aspects described below or in connection with one or more other processes described elsewhere herein.

In some aspects, the PUCCH transmission includes: the SR and a HARQ ACK, the SR and CSI, the SR, the HARQ ACK, and the CSI, or the SR without the HARQ ACK or the CSI. In some aspects, the UE may perform multiplexing of UCI associated with the SR and the HARQ ACK or the CSI prior to determining whether the collision is to occur, and may determine a resource to be used for the PUCCH transmission based at least in part on performing the multiplexing of the UCI.

In some aspects, the UE may determine whether the multiple PUSCH transmissions include a PUSCH transmission with a UL-SCH transmission in the slot based at least in part on determining whether the collision is to occur. In some aspects, the UE may determine that the multiple PUSCH transmissions include the PUSCH transmission with the UL-SCH transmission in the slot, and may determine to not transmit the SR with the PUCCH transmission based at least in part on determining that the multiple PUSCH transmissions include the PUSCH transmission with the UL-SCH transmission in the slot.

In some aspects, the UE may determine to not re-determine a resource for the PUCCH transmission based at least in part on dropping the SR from the PUCCH transmission. In some aspects, the UE may drop the PUCCH transmission based at least in part on dropping the SR from the PUCCH transmission.

In some aspects, the UE may perform multiplexing of remaining UCI associated with the PUCCH transmission with one of the multiple PUSCH transmissions based at least in part on dropping the SR, and may drop the PUCCH transmission includes dropping the PUCCH transmission based at least in part on performing the multiplexing. In some aspects, the UE may transmit the PUCCH transmission or the multiple PUSCH transmissions includes transmitting the multiple PUSCH transmissions based at least in part on dropping the PUCCH transmission.

In some aspects, the UE may determine that the multiple PUSCH transmissions do not include the PUSCH transmission with the UL-SCH transmission, and may drop the multiple PUSCH transmissions based at least in part on determining that the multiple PUSCH transmissions do not include the PUSCH transmission with the UL-SCH transmission. In some aspects, the UE may transmit the PUCCH transmission or the multiple PUSCH transmissions includes transmitting the PUCCH transmission based at least in part on dropping the multiple PUSCH transmissions. In some aspects, the UE may determine whether the PUCCH transmission and the multiple PUSCH transmissions overlap in the slot.

Figure 12:
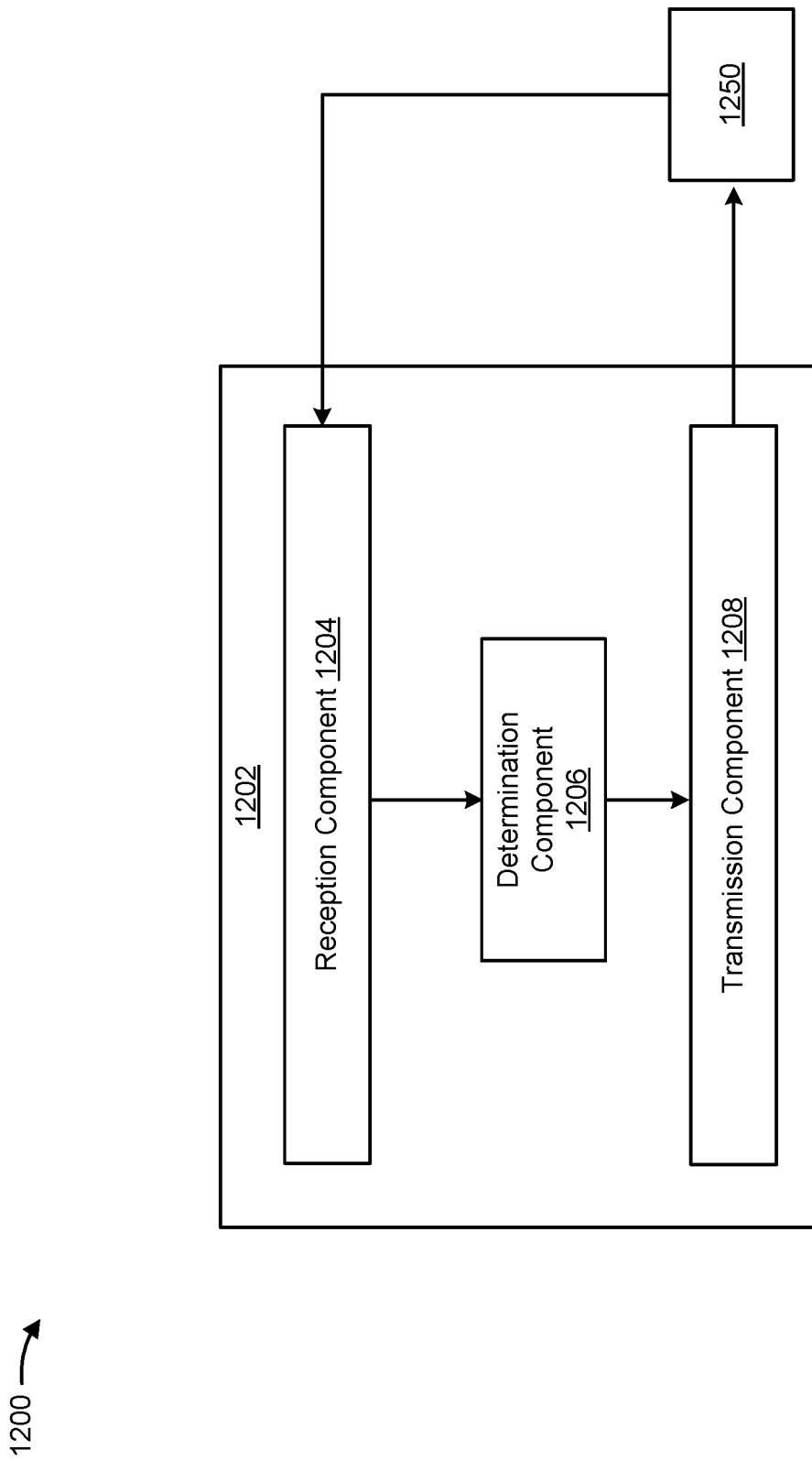
FIG. 12 is a conceptual data flow diagram illustrating the data flow between different components in an example apparatus.

FIG. 12 is a conceptual data flow diagram 1200 illustrating the data flow between different components in an example apparatus 1202. The apparatus 1202 may be a UE. In some aspects, the apparatus 1202 includes a reception component 1204, a determination component 1206, a transmission component 1208, or a combination thereof, among other examples.

In some aspects, the reception component 1204 may receive (for example, from apparatus 1250, such as a base station) scheduling information for a PUCCH transmission, one or more PUSCH transmissions, or a combination thereof. The determination component 1206 may determine whether a collision is to occur between a PUCCH transmission, that includes an SR, and multiple PUSCH transmissions in a slot. The transmission component 1208 may transmit, to the apparatus 1250, the PUCCH transmission or the multiple PUSCH transmissions based at least in part on determining whether the collision is to occur in the slot.

The apparatus may include additional components that perform each of the blocks of the algorithm in the aforementioned process 1100 of FIG. 11, among other examples. For example, each block in the aforementioned process 1100 of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of components (one or more components) shown in FIG. 12 may perform one or more functions described as being performed by another set of components shown in FIG. 12.

Figure 13:
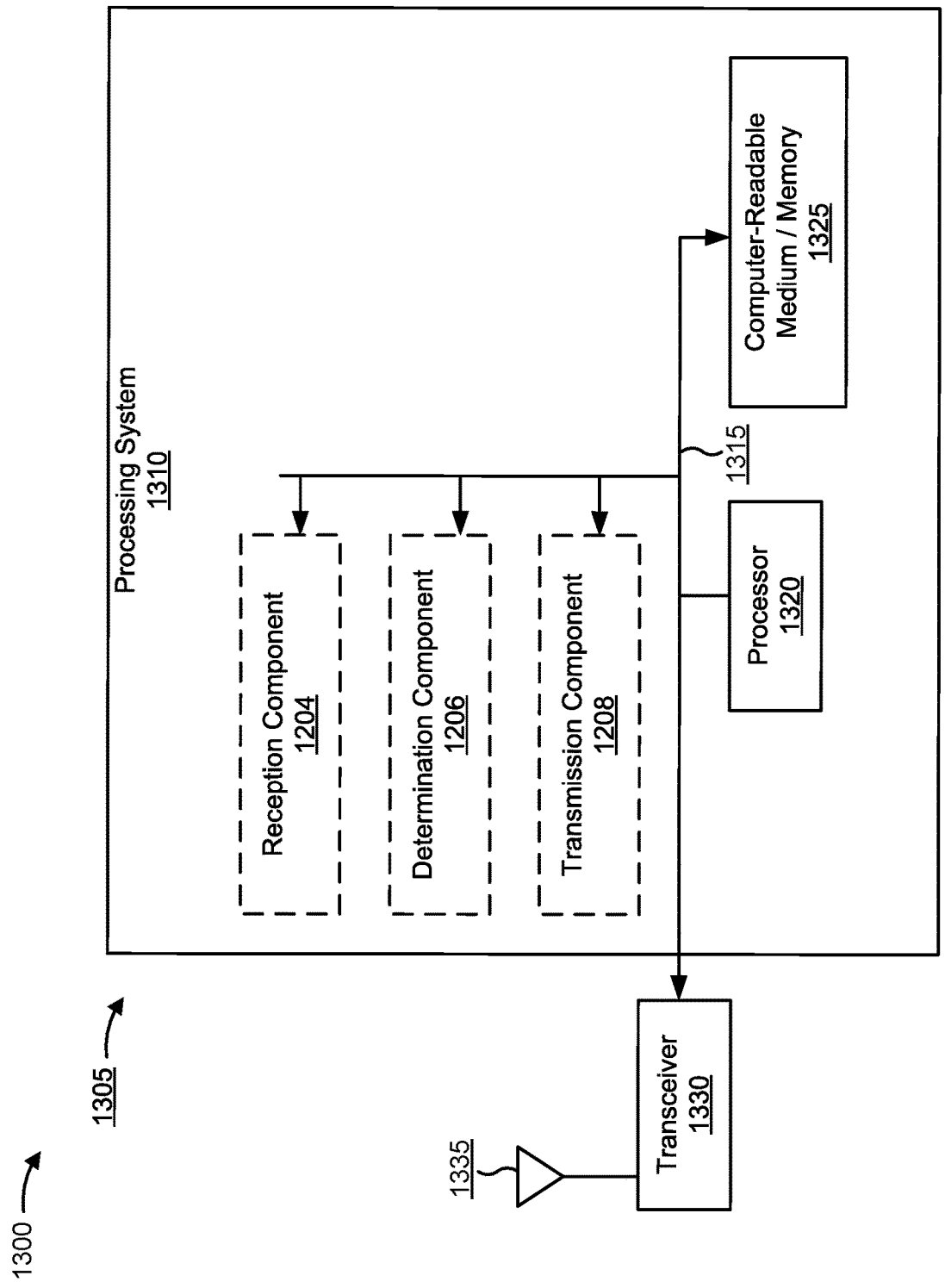
FIG. 13 is a diagram illustrating an example of a hardware implementation for an apparatus employing a processing system.

FIG. 13 is a diagram 1300 illustrating an example of a hardware implementation for an apparatus 1305 employing a processing system 1310. The apparatus 1305 may be a UE.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors or hardware components, represented by the processor 1320, the components 1204, 1206, or 1208, among other examples, and the computer-readable medium/memory 1325. The bus 1315 may also link various other circuits such as timing sources, peripherals, voltage regulators, and power management circuits, which are well known in the art, and therefore will not be described any further.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1204. In addition, the transceiver 1330 receives information from the processing system 1310, specifically the transmission component 1208, and based at least in part on the received information, generates a signal to be applied to the one or more antennas 1335.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the components 1204, 1206, or 1208. The components may be software modules running in the processor 1320, resident/stored in the computer readable medium/memory 1325, one or more hardware modules coupled to the processor 1320, or some combination thereof.

In some aspects, the processing system 1310 may be a component of the UE 120 and may include the memory 282 and at least one of the TX MIMO processor 266, the RX processor 258, or the controller/processor 280. In some aspects, the apparatus 1305 for wireless communication includes means for determining whether a collision is to occur between a PUCCH transmission that includes a SR, and multiple PUSCH transmissions in a slot; means for transmitting, to a BS, the PUCCH transmission or the multiple PUSCH transmissions based at least in part on determining whether the collision is to occur in the slot; or the like, or combinations thereof. The aforementioned means may be one or more of the aforementioned components of the apparatus 1202 or the processing system 1310 of the apparatus 1305 configured to perform the functions recited by the aforementioned means. As described elsewhere herein, the processing system 1310 may include the TX MIMO processor 266, the RX processor 258, the controller/processor 280, or a combination thereof, among other examples. In one configuration, the aforementioned means may be the TX MIMO processor 266, the RX processor 258, or the controller/processor 280, among other examples configured to perform the functions or operations recited herein.

FIG. 13 is provided as an example. Other examples may differ from what is described in connection with FIG. 13.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining whether a collision is to occur between a physical uplink control channel (PUCCH) transmission that includes a scheduling request (SR) and remaining uplink control information (UCI), and multiple physical uplink shared channel (PUSCH) transmissions in a slot,
      wherein at least one PUSCH transmission of the multiple PUSCH transmissions includes a PUSCH transmission with an uplink shared channel (UL-SCH) transmission in the slot;
   dropping the SR;
   performing multiplexing of the remaining UCI with one of the multiple PUSCH transmissions based at least in part on determining that the collision is to occur; and
   transmitting, to a base station (BS), the multiple PUSCH transmissions based at least in part on determining whether the collision is to occur in the slot.

2. The method of claim 1, wherein the PUCCH transmission includes:
   the SR and a hybrid automatic repeat request (HARQ) acknowledgement (ACK),
   the SR and channel state indication (CSI),
   the SR, the HARQ ACK, and the CSI, or
   the SR without the HARQ ACK or the CSI.

3. The method of claim 2, further comprising:
   determining a resource to be used for the multiple PUSCH transmissions based at least in part on performing the multiplexing of the remaining UCI.

4. The method of claim 1, further comprising determining whether the multiple PUSCH transmissions include a PUSCH transmission with an UL-SCH transmission in the slot based at least in part on determining whether the collision is to occur.

5. The method of claim 4, further comprising:
   determining that the multiple PUSCH transmissions include the PUSCH transmission with the UL-SCH transmission in the slot; and
   determining to not transmit the SR with the PUCCH transmission based at least in part on determining that the multiple PUSCH transmissions include the PUSCH transmission with the UL-SCH transmission in the slot.

6. The method of claim 5, further comprising determining to not re-determine a resource for the PUCCH transmission based at least in part on dropping the SR from the PUCCH transmission.

7. The method of claim 5, further comprising:
   dropping the PUCCH transmission based at least in part on dropping the SR from the PUCCH transmission.

8. The method of claim 7,
   wherein dropping the PUCCH transmission comprises dropping the PUCCH transmission based at least in part on performing the multiplexing.

9. The method of claim 7, wherein transmitting the the multiple PUSCH transmissions comprises transmitting the multiple PUSCH transmissions based at least in part on dropping the PUCCH transmission.

10. The method of claim 4, further comprising:
    determining that another set of PUSCH transmissions do not include another PUSCH transmission with another UL-SCH transmission; and
    dropping the other set of PUSCH transmissions based at least in part on determining that the other set of PUSCH transmissions does not include the other PUSCH transmission.

11. The method of claim 10, further comprising:
    transmitting another PUCCH transmission, scheduled to collide with the other set of PUSCH transmissions and including another SR, based at least in part on dropping the other set of PUSCH transmissions.

12. The method of claim 1, wherein determining whether the collision is to occur comprises determining whether the PUCCH transmission and the multiple PUSCH transmissions overlap in the slot.

13. A user equipment (UE) for wireless communication, comprising:
    one or more memories; and
    one or more processors operatively coupled to the one or more memories, the one or more processors configured to:
       determine whether a collision is to occur between a physical uplink control channel (PUCCH) transmission that includes a scheduling request (SR) and remaining uplink control information (UCI), and multiple physical uplink shared channel (PUSCH) transmissions in a slot,
          wherein at least one PUSCH transmission of the multiple PUSCH transmissions includes a PUSCH transmission with an uplink shared channel (UL-SCH) transmission in the slot;
       drop the SR;

perform multiplexing of the remaining UCI with one of the multiple PUSCH transmissions based at least in part on determining that the collision is to occur; and transmit, to a base station (BS), the multiple PUSCH transmissions based at least in part on determining whether the collision is to occur in the slot.

14. The UE of claim 13, wherein the PUCCH transmission includes:
the SR and a hybrid automatic repeat request (HARQ) acknowledgement (ACK),
the SR and channel state indication (CSI),
the SR, the HARQ ACK, and the CSI, or
the SR without the HARQ ACK or the CSI.

15. The UE of claim 14, wherein the UE is further configured to:
determine a resource to be used for the multiple PUSCH transmissions based at least in part on performing the multiplexing of the remaining UCI.

16. The UE of claim 13, wherein the UE is further configured to determine whether the multiple PUSCH transmissions include a PUSCH transmission with an UL-SCH transmission in the slot based at least in part on determining whether the collision is to occur.

17. The UE of claim 16, wherein the UE is further configured to:
determine that the multiple PUSCH transmissions include the PUSCH transmission with the UL-SCH transmission in the slot; and
determine to not transmit the SR with the PUCCH transmission based at least in part on determining that the multiple PUSCH transmissions include the PUSCH transmission with the UL-SCH transmission in the slot.

18. The UE of claim 17, wherein the UE is further configured to determine to not re-determine a resource for the PUCCH transmission based at least in part on dropping the SR from the PUCCH transmission.

19. The UE of claim 17, wherein the UE is further configured to:
drop the PUCCH transmission based at least in part on dropping the SR from the PUCCH transmission.

20. The UE of claim 19,
wherein the UE, when dropping the PUCCH transmission, is configured to drop the PUCCH transmission based at least in part on performing the multiplexing.

21. The UE of claim 19, wherein the UE, when transmitting the multiple PUSCH transmissions, is configured to transmit the multiple PUSCH transmissions based at least in part on dropping the PUCCH transmission.

22. The UE of claim 16, wherein the UE is further configured to:
determine that another set of PUSCH transmissions do not include another PUSCH transmission with another UL-SCH transmission; and
drop the other set of PUSCH transmissions based at least in part on determining that the other set of PUSCH transmissions does not include the other PUSCH transmission.

23. The UE of claim 22, wherein the UE is further configured to:
transmit another PUCCH transmission, scheduled to collide with the other set of PUSCH transmissions and including another SR, based at least in part on dropping the other set of PUSCH transmissions.

24. The UE of claim 13, wherein the UE, when determining whether the collision is to occur, is configured to determine whether the PUCCH transmission and the multiple PUSCH transmissions overlap in the slot.

25. A non-transitory computer-readable medium storing one or more instructions for wireless communication, the one or more instructions comprising:
one or more instructions that, when executed by one or more processors of a user equipment (UE), cause the one or more processors to:
determine whether a collision is to occur between a physical uplink control channel (PUCCH) transmission that includes a scheduling request (SR) and remaining uplink control information (UCI), and multiple physical uplink shared channel (PUSCH) transmissions in a slot,
wherein at least one PUSCH transmission of the multiple PUSCH transmissions includes a PUSCH transmission with an uplink shared channel (UL-SCH) transmission in the slot;
drop the SR;
perform multiplexing of the remaining UCI with one of the multiple PUSCH transmissions based at least in part on determining that the collision is to occur; and
transmit, to a base station (BS), the multiple PUSCH transmissions based at least in part on determining whether the collision is to occur in the slot.

26. The non-transitory computer-readable medium of claim 25, wherein the PUCCH transmission includes:
the SR and a hybrid automatic repeat request (HARQ) acknowledgement (ACK),
the SR and channel state indication (CSI),
the SR, the HARQ ACK, and the CSI, or
the SR without the HARQ ACK or the CSI.

27. The non-transitory computer-readable medium of claim 26, wherein the one or more instructions, when executed by the one or more processors, cause the one or more processors to:
determine a resource to be used for the multiple PUSCH transmissions based at least in part on performing the multiplexing of the remaining UCI.

28. A first apparatus for wireless communication, comprising:
means for determining whether a collision is to occur between a physical uplink control channel (PUCCH) transmission that includes a scheduling request (SR) and remaining uplink control information (UCI), and multiple physical uplink shared channel (PUSCH) transmissions in a slot,
wherein at least one PUSCH transmission of the multiple PUSCH transmissions includes a PUSCH transmission with an uplink shared channel (UL-SCH) transmission in the slot;
means for dropping the SR;
means for performing multiplexing of the remaining UCI with one of the multiple PUSCH transmissions based at least in part on determining that the collision is to occur; and
means for transmitting, to a second apparatus, the multiple PUSCH transmissions based at least in part on determining whether the collision is to occur in the slot.

29. The first apparatus of claim 28, wherein the PUCCH transmission includes:
the SR and a hybrid automatic repeat request (HARQ) acknowledgement (ACK),
the SR and channel state indication (CSI),
the SR, the HARQ ACK, and the CSI, or
the SR without the HARQ ACK or the CSI.

30. The first apparatus of claim 29, further comprising:
means for determining a resource to be used for the multiple PUSCH transmissions based at least in part on performing the multiplexing of the remaining UCI.

* * * * *